United States Patent [19]
Huebener et al.

[11] 3,916,432
[45] Oct. 28, 1975

[54] SUPERCONDUCTIVE MICROSTRIP EXHIBITING NEGATIVE DIFFERENTIAL RESISTIVITY

[75] Inventors: Rudolf P. Huebener, Downers Grove, Ill.; Dennis E. Gallus, Falls Church, Va.

[73] Assignee: The United States of America as represented by the Energy Research and Development Administration, Washington, D.C.

[22] Filed: May 17, 1974

[21] Appl. No.: 470,898

[52] U.S. Cl. ...................... 357/57; 357/4; 307/306; 307/286; 307/298; 307/277; 307/322; 338/13
[51] Int. Cl.²......................................... H01L 29/66
[58] Field of Search ........... 307/306, 286, 298, 277, 307/322; 357/4, 57; 331/107 S; 338/13, 25

[56] References Cited

UNITED STATES PATENTS 3,149,298 9/1964 Handleman .......................... 338/22
3,483,110 12/1969 Rozgonyi .......................... 204/192
3,491,000 1/1970 Fuls ..................................... 204/38

*Primary Examiner*—Martin H. Edlow
*Attorney, Agent, or Firm*—Dean E. Carlson; Arthur A. Churm; Donald P. Reynolds

[57] ABSTRACT

A device capable of exhibiting negative differential electrical resistivity over a range of values of current and voltage is formed by vapor-depositing a thin layer of a material capable of exhibiting superconductivity on an insulating substrate, establishing electrical connections at opposite ends of the deposited strip, and cooling the alloy into its superconducting range. The device will exhibit negative differential resistivity when biased in the current-induced resistive state.

8 Claims, 5 Drawing Figures

SUPERCONDUCTIVE MICROSTRIP EXHIBITING NEGATIVE DIFFERENTIAL RESISTIVITY

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to negative electrical resistance devices.

The term "negative resistance" is frequently applied to describe a phenomenon observed in certain devices in which a portion of the current-voltage characteristic exhibits a region of negative slope. Strictly speaking, this phenomenon is better denoted negative differential resistivity. The utility of a device exhibiting negative differential resistivity lies in the possibility of achieving amplification or oscillation that represents conversion of part of the energy of a biasing source into usable signal energy. An early device exhibiting negative differential resistivity was the vacuum tetrode. Under conditions when the plate voltage of a tetrode is less than the screen voltage, both with respect to the cathode, the characteristic of plate current versus plate voltage exhibits a region of negative differential resistivity as a result of a secondary emission from the plate that opposes the direction of cathode current. This phenomenon was exploited in the so-called dynatron oscillator.

In the solid-state era, one of the most frequently used negative resistance devices is the tunnel diode. For a range of values of current through the diode, the decrease in tunneling current is greater than the increase in forward current through the diode and the net effect is a region of negative differential resistance that has been utilized in tunnel diode oscillators and amplifiers. Another useful negative resistance device is the Gunn-effect diode which produces a negative differential resistivity by propagation across the depletion region of a semiconductor of a narrow domain of high electric fields. As stated, the common thread linking each of these devices is a region in the current-voltage characteristic that exhibits a negative slope when the current and voltage references are chosen in the conventional sense. The conventional sense of references choice of reference is taken to describe a combination in which the conventional current enters the device in question at the positive voltage reference symbol. In each of these devices, with the possible exception of the dynatron oscillator, the total "resistance" of the device is positive. The total "resistance" is the slope of the line joining an operating point on a current-voltage plot with the origin of the plot. Thus, each of the devices in question normally functions as a passive device in total, although each is capable of appearing as an active device in a range of variation of parameters about an operating point fixed in the region of negative differential resistance.

Various other devices exhibit regions of negative differential resistivity over portions of their current-voltage characteristics. These include the unijunction transistor, the backward diode, the four-layer diode or p-n-p-n, the silicon-controlled rectifier, and the thyristor. Although each of these devices is normaally used in a mode of operation that does not exploit its negative differential resistivity, each has been used in some applications as a negative-resistance device.

The known commercial utility of some of the above devices suggests the possibility that there may be room for further development of negative differential resistance devices as oscillators and amplifiers in competition with tunnel diodes, Gunn-effect devices, and the others listed. In addition, a superconducting device exhibiting negative differential resistance has the added possibility of providing a small or zero value of internal impedance, thus increasing its utility as a power source at signal frequencies. Such a device has further utility as a circuit element capable of operating at cryogenic temperatures, to allow the placement of circuit elements in the cryogenic environment for purposes of measurement and control.

It is, therefore, an object of the present invention to provide a new device exhibiting a region of negative differential electrical resistivity.

SUMMARY OF THE INVENTION

A microstrip of a material capable of exhibiting superconductivity is deposited on an insulating substrate. Electrical connections at both ends of the microstrip and operation of the device in a cryogenic temperature range below the critical temperature of the alloy provide a device that exhibits a negative differential resistivity over a range of parameter values in which the current through the device is in the range of the current-induced resistive state.

DESCRIPTION OF THE PREFERRED EMBODIMENT

Figure 1:
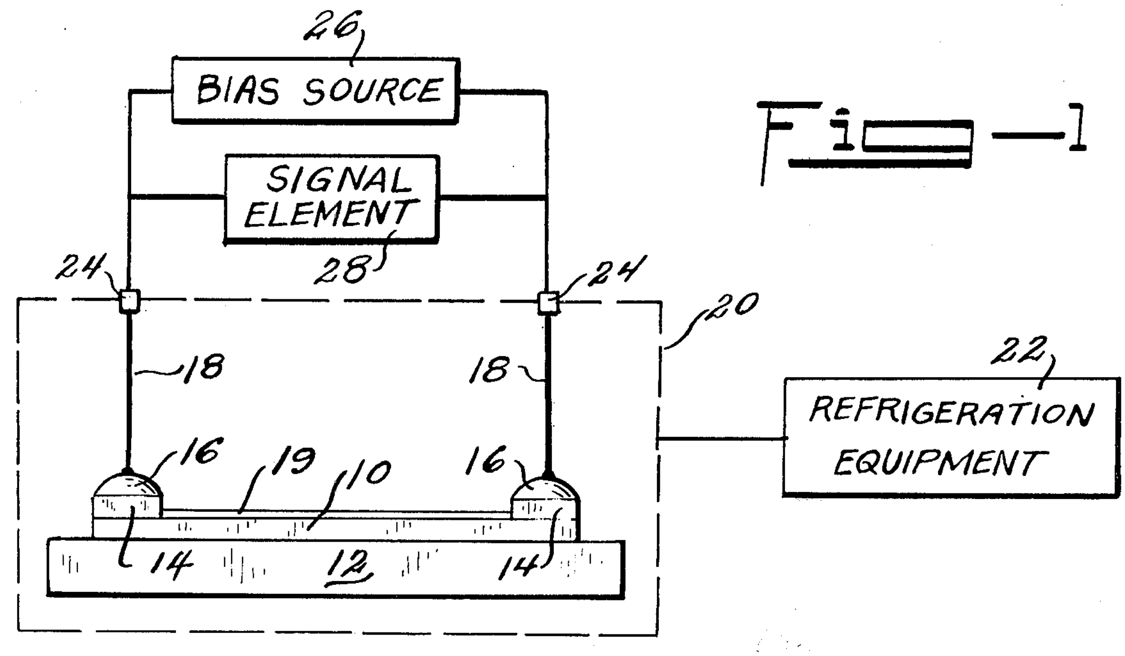
FIGS. 1 and 2 are a side and a top view respectively of an apparatus for the practice of the present invention.
Figure 2:
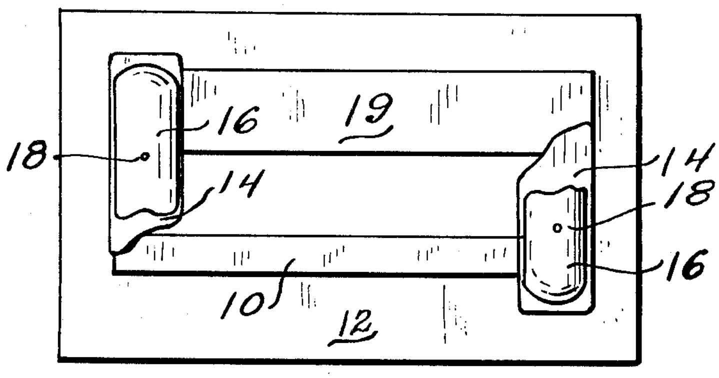

FIGS. 1 and 2 are views of an apparatus for the practice of the present invention. In FIGS. 1 and 2, strip 10 is a microstrip of a superconducting material that is vapor-deposited on an insulating substrate 12 to a thickness of the order of 1 μm. Two contact strips 14 comprising thin films of lead are connected to strip 10, one at each end. The width of the strip 10 is of the order of 100 μm. Each contact strip 14 is connected by solder 16 to a lead 18. Shunt 19, a copper strap, is paralleled electrically to strip 10 to protect against thermal runaway. The dimensions of shunt 19 are chosen to provide a conductance that is small compared with that of strip 10 when superconducting, but large compared with the conductance of strip 10 in the normal state. All the items thus far described are in cryogenic enclosure 20 and are maintained at a temperature slightly below the critical temperature of strip 10 by refrigerating equipment 22. Feedthroughs 24 establish an electrical connection of leads 18 through and out of cryogenic enclosure 20. Two elements are shown in block form connected electrically between the two leads 18 outside cryogenic enclosure 20. The first of these is bias source 26 which is necessary to maintain strip 10 in the current-controlled resistive state. This is the region of its current-voltage characteristic in which strip 10 exhibits negative differential resistivity. Bias source 26 supplies the current to fix an operating point in this state. Signal element 28 is also connected between the two leads 18 to provide for signal input and output. Both bias source 26 and signal element 28 are shown separately in FIG. 1, but they may be combined entirely or partly in their function, depending upon the circuit application in which the negative resistance element is used.

The thin-film devices exhibiting negative differential resistivity that are disclosed herein operate in the current-induced resistive state of a superconducting strip. This state is characteristic of a superconducting material in a thin film that is maintained below its critical temperature and that contains a combination of normal and superconducting domains within the superconducting material. This state exists in thin-film superconductors in a range of currents less than those that drive the material to the normal state. The particular superconductor used herein was an alloy of lead and bismuth at a nominal bismuth concentration of 5 atomic percent. This is a type-II superconductor. The concentration of the elements described herein is not critical and the type of superconductor is not critical, as the current-induced resistive state has been observed in microstrips of type-I superconductors such as lead and indium.

An example of such a thin-film device was prepared by mixing high-purity lead and bismuth by melting them with an induction heater in an evacuated quartz tube. This alloy was kept above the melting point for 90 minutes while it was agitated to mix the constituents. The quartz tube was then quenched with cold water to provide an alloy for vacuum deposition. The insulating substrate was glass. Strips were deposited with an electron gun system to a thickness less than 2 $\mu$m, of the order of 1 $\mu$m. An adjustable mask using razor blades at the edges served to define the edge of the strip to a width of 107 $\mu$m. At the ends of the strip, approximately 6 mm apart, lead-film sections 8 $\mu$m thick and 12 $\mu$m wide were attached to provide points for soldering connection. The microstrip was protected against destruction by thermal runaway by attaching a shunt having a resistance of about 20 milliohms physically and electrically parallel to the strip. The effect of this shunt is negligible in normal operation because its resistance is at least two orders of magnitude larger than the resistance of the strip. Voltage was measured to a resolution of $10^{-2}$ microvolts with a potentiometer.

Figure 3:
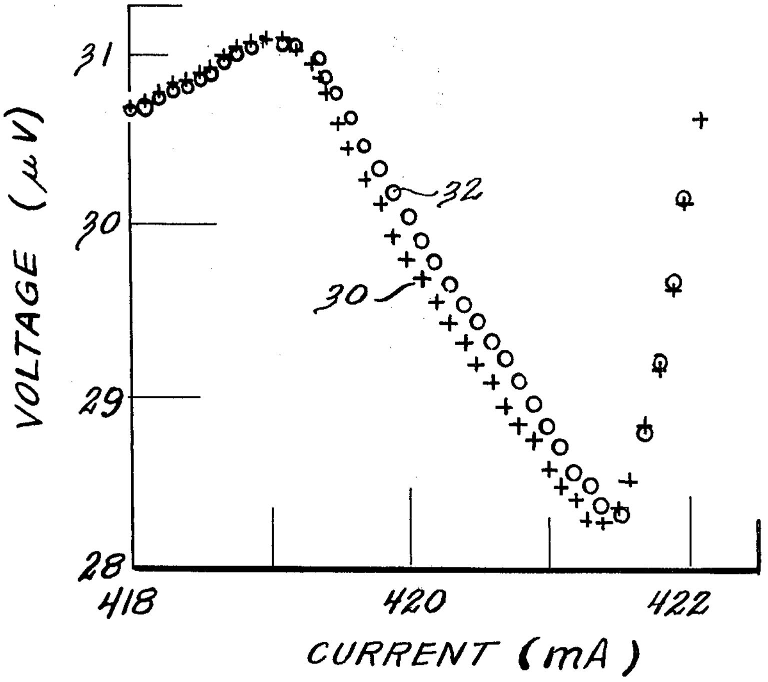
FIGS. 3 and 4 are current-voltage characteristics of an embodiment of the present invention.
Figure 4:
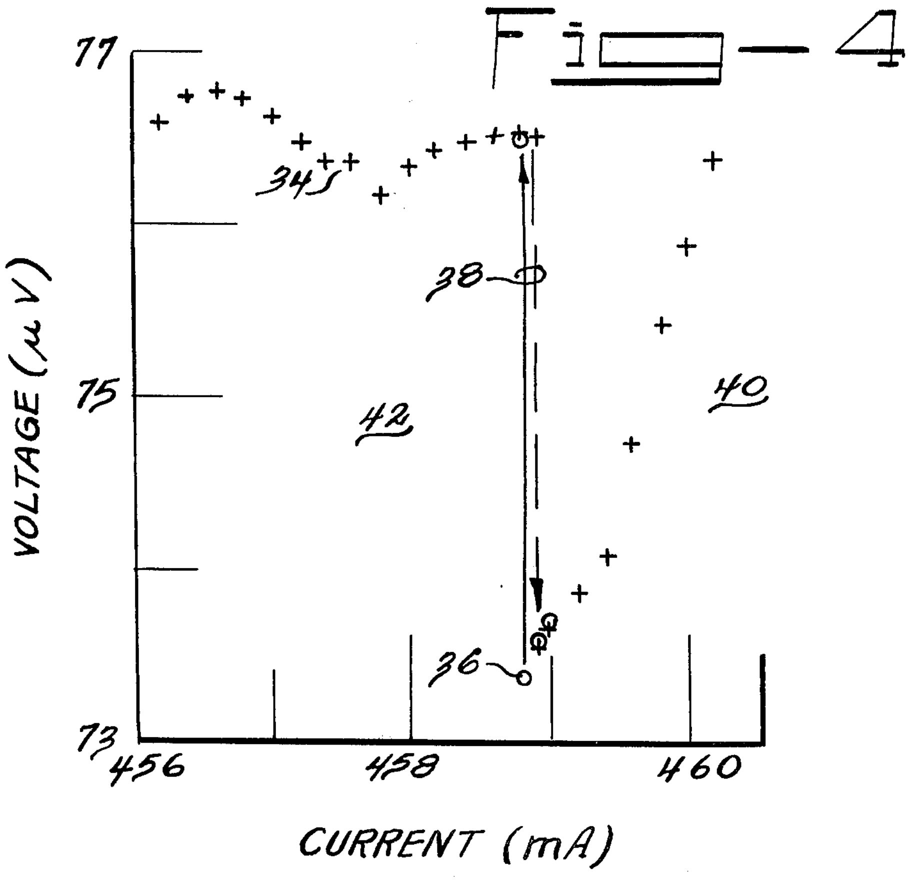

FIGS. 3 and 4 are current-voltage characteristics taken on a strip of lead-bismuth alloy at a temperature of 2.08°K. Each of the observed characteristics has points taken as the current increased and as the current decreased. In FIG. 3 it can be seen that the region of currents between 419 and 421.5 mA exhibits a continuous region having a negative slope. FIG. 4, on the other hand, exhibits a region in which the voltage shows a repeatable discontinuous jump between 76.5 and 73.5 microvolts at a current of approximately 458.7 mA. Reversibility of each of these phenomena is demonstrated in FIGS. 3 and 4 by points showing that the phenomena were observed both with increasing and with decreasing current. In FIG. 3, points 30 comprise points taken when the current was increasing, while points 32 were taken with decreasing current. The phenomenon of negative differential resistivity is observed at approximately the same magnitude whether the current is increasing or decreasing. The same repeatability occurs in FIG. 4, in which points 34 were taken with increasing current and points 36 were taken about the region of discontinuity 38 when the current was decreasing. Transitions between the right-hand portion 40 and the left-hand portion 42 of the set of points in FIG. 4 also exhibit the negative slope associated with a negative differential resistivity. A current source driving a current between 419 and 421.5 mA through this strip would thus serve to bias the strip in a region of negative differential resistivity. Such a source could equally as well be set at a value near this range, or near 458.7 mA, to have a signal switch a device into or through a region of negative differential resistivity. The desired bias point for operation depends upon the specific circuit application, i.e., oscillation, amplification, switching, flip-flop, or the like.

Figure 5:
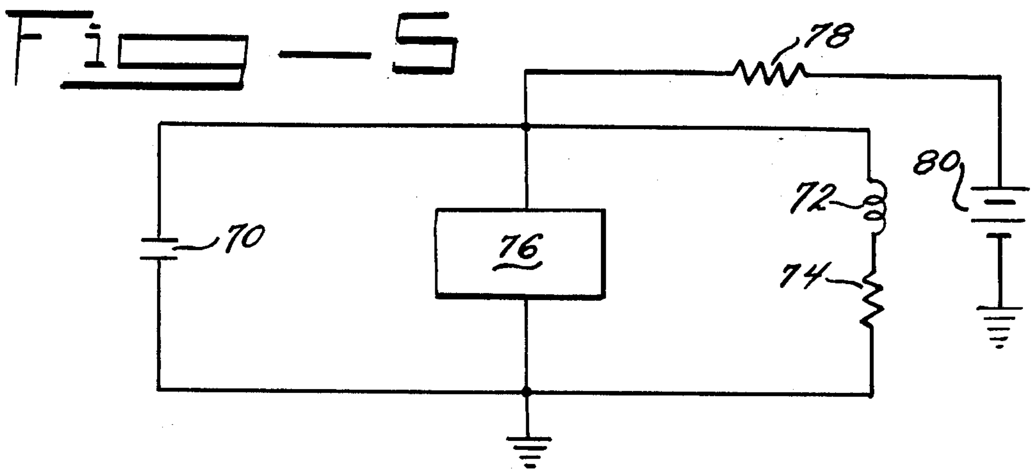
FIG. 5 is an electrical circuit diagram incorporating an embodiment of the present invention.

An electrical circuit utilizing the negative resistance device of the instant invention is shown in FIG. 5. This is a typical oscillator analogous to the tunnel-diode oscillator with the device of the present invention used as the negative-resistance element. In FIG. 5 a parallel tuned circuit is formed by the parallel combination of capacitor 70 and inductor 72. The resistance 74 in series with inductor 72 represents the unavoidable series resistance of a physical inductor. Negative resistance device 76 is connected across the parallel tuned circuit and the three elements are connected to resistor 78 and thence to voltage source 80. Resistor 78 and voltage source 80 are selected to bias negative resistance device 76 in a range where it shows negative differential resistivity. The objective is to select a value of negative differential resistivity that is less than the resistance of resistor 74. In this way, the net differential or a-c resistance appearing across the terminals of the tuned circuit comprising capacitor 70 and inductor 72 can be made a negative number. This will result in oscillation at a frequency determined by the parameters of the tuned circuit. An output at the oscillating frequency can be taken either across capacitor 70 or by inductive coupling to inductor 72 according to wellknown techniques.

The phenomenon of negative differential resistivity exists in both type-I and type-II superconductors when they are operated in the current-induced resistive state. The current-induced resistive state is a descriptive term applied to the phenomenon observed in superconductors operated with high current densities at a temperature close to but below the critical temperature. In the material, this state appears to be associated with the generation of long channels of material switched out of the superconducting state and into the normal state. These channels comprise arrays of tubes of magnetic flux that move rapidly from an edge of the strip, moving perpendicular to the direction of average current flow in the strip. In the center of the strip each tube collides with and annihilates a similar tube of magnetic flux having the opposite sense that has originated at the opposite side of the strip. This complicated dynamic behavior within the strip produces an external electrical characteristic that is stable in time but that has regions of negative differential resistivity.

The embodiments of the invention in which an exclusive property or privilege is claimed are defined as follows:

1. A thin-film device exhibiting negative differential electrical resistivity comprising:

an electrically insulating substrate;

a material capable of exhibiting superconductivity disposed in a thin film on the substrate;

a first terminal electrically connected to said material at a first location;

a second terminal electrically connected to said material at a second location;

means for cooling said material into its superconducting temperature range; and a current supply coupled to said material for supplying a predetermined value of electric current through said material to drive said material into a current-induced resistive state, whereby the device exhibits negative differential resistivity between said first and second terminals.

2. The device of claim 1 wherein said material is less than 2 micrometers thick.

3. The device of claim 1 wherein said material is a type-I superconductor.

4. The device of claim 1 wherein said material is a type-II superconductor.

5. The device of claim 1 wherein said material is an alloy of lead and bismuth.

6. The device of claim 1 comprising in addition a conducting shunt connected electrically in parallel with said material.

7. The device of claim 1 wherein said current supply is coupled to said material for supplying a predetermined value of electric current through said material to bias said material near a point in the current-induced resistive state exhibiting negative differential resistivity.

8. The device of claim 1 wherein said current supply is coupled to said material for supplying a predetermined value of electric current through said material to bias said material at a point in the current-induced resistive state exhibiting negative differential resistivity.

* * * * *